US007038976B2

(12) United States Patent

Winkler et al.

(10) Patent No.: US 7,038,976 B2
(45) Date of Patent: May 2, 2006

(54) LIGHTING DEVICE WITH CENTRAL SYMMETRY FOR A DIAL

(75) Inventors: Pascal Winkler, Saint-Blaise (CH); Gian-Carlo Poli, Les Geneveys-sur-Coffrane (CH); Joachim Grupp, Enges (CH)

(73) Assignee: Asulab S.A., Marin (CH)

( * ) Notice: Subject to any disclaimer, the term of this patent is extended or adjusted under 35 U.S.C. 154(b) by 0 days.

(21) Appl. No.: 11/230,566

(22) Filed: Sep. 21, 2005

(65) Prior Publication Data

US 2006/0067168 A1 Mar. 30, 2006

(30) Foreign Application Priority Data

Sep. 29, 2004 (EP) .................................. 04023172

(51) Int. Cl.
*G01D 11/28* (2006.01)
*G04B 19/30* (2006.01)

(52) U.S. Cl. ........................ 368/67; 368/277; 368/296; 362/26; 362/29; 362/623

(58) Field of Classification Search .................. 368/67, 368/223, 227, 228, 294–296; 362/23, 26, 362/29, 615, 623–626
See application file for complete search history.

(56) References Cited

U.S. PATENT DOCUMENTS

| | | | | |
|---|---|---|---|---|
| 2,761,056 | A | 8/1956 | Lazo | |
| 3,328,570 | A | 6/1967 | Balchunas | |
| 3,349,234 | A | 10/1967 | Schwarz | |
| 3,859,782 | A | 1/1975 | Kitai | |
| 4,115,994 | A | 9/1978 | Tomlinson | |
| 4,118,924 | A | 10/1978 | Foellner | |
| 5,984,485 | A | 11/1999 | Poli | |
| 6,106,127 | A | 8/2000 | Fuwausa | |
| 6,299,321 | B1 | 10/2001 | Fuwausa | |
| 6,452,872 | B1 | 9/2002 | Teijido et al. | |
| 6,647,199 | B1 * | 11/2003 | Pelka et al. | 385/146 |
| 6,730,530 | B1 * | 5/2004 | Fuwausa et al. | 438/22 |

* cited by examiner

*Primary Examiner*—Vit W. Miska
(74) *Attorney, Agent, or Firm*—Sughrue Mion, PLLC

(57) ABSTRACT

A light source (15) is housed in a housing (6) of a case, underneath the dial (10) opposite a guide (17) directing the light onto a reflector (20), formed in a hollow in the internal or external face of a crystal (1) the thickness of which decreases regularly from the center to the periphery thereof for reorienting the light by total internal reflection into the crystal (1) until it emerges towards the dial (10) when the maximum refractive index is exceeded.

14 Claims, 2 Drawing Sheets

LIGHTING DEVICE WITH CENTRAL SYMMETRY FOR A DIAL

FIELD OF THE INVENTION

The present invention concerns a lighting device with central symmetry for a measuring apparatus dial, such as an instrument panel dial or a timepiece dial in which it is desirable for the information carried by the dial at the same distance from the centre receive the same lighting.

BACKGROUND OF THE INVENTION

In order to enable a user to read the information carried by a dial when the ambient light is weak, or even in the dark, designers have conceived numerous solutions, of which only those that use an electrical, micro-bulb, diode or other light source will be mentioned within the scope of the present invention.

A single diode arranged in the housing of a flange, between the crystal and the dial, evidently does not provide uniform lighting and adding more diodes around the dial still leaves areas of shadow. This can be satisfactory when the desired objective is essentially technical, for example an automobile vehicle dashboard, but this is not the case when there is also an aesthetic concern, as is the case in a timepiece.

In order to have more uniform lighting, numerous Patents propose injecting light from the light source into a waveguide arranged around the dial on the flange, or replacing the latter. U.S. Pat. Nos. 5,984,485 and 6,452,872 disclose for example guides whose surfaces have particular structuring for reducing the influence of losses along the guide and for reorienting the light towards the dial. The lighting is more uniform than before, but not entirely satisfactory. Moreover structuring the guide is a difficult operation, both from the production point of view and from the reproducibility point of view, and contributes eventually to increasing the cost.

In order to have uniform lighting, certain documents disclose devices wherein the light source is placed at the centre of the dial, on the crystal, and directly lights the subjacent dial and the markings that it bears.

Such a device, for example disclosed in U.S. Pat. No. 4,115,994, comprises a light source positioned on the lower face of a crystal of unequal thickness and connected to the energy source by two juxtaposed conductive wires, embedded in the thickness of the crystal. U.S. Pat. No. 4,118,924 discloses a device wherein at least one light source is also positioned on the lower face of a crystal of equal thickness while being connected by two conductive wires in the extension of each other. In this document, one embodiment discloses lighting by means of a plurality of diodes arranged above the grids of a digital display, the conductive wires of each diode in a way creating a “spider web” in the crystal. Such direct lighting allows annular distribution of the light, but does not provide uniform lighting of the whole dial. Moreover, the presence of conductive wires in the crystal produces an unattractive effect unsuitable for a timepiece.

U.S. Pat. No. 6,106,127 proposes reducing the aforementioned drawback by passing the conductive wires through a hole arranged through the arbour of the hands, which is a step towards a more attractive embodiment, but does not remove the problem of halo effect lighting.

The hand arbour was also used for example in the past as a light guide. U.S. Pat. No. 3,859,782 discloses for example a device wherein a light source is arranged at the back of the dial facing the hour wheel pipe, the other end of which opens out opposite a small reflector bonded under a crystal whose two faces are parallel. The drawback regarding the wires does not exist, but, in addition to the difficulty of passing the wires through the hour wheel pipe without subsequently adversely affecting the free rotation thereof, “uniform” lighting of the dial cannot be obtained with a reflector returning the incident light directly onto the dial.

SUMMARY OF THE INVENTION

It is an object of the present invention to overcome the drawbacks of the aforecited prior art by providing a lighting device with central symmetry by means of a single light source arranged under the dial and a particular arrangement made through the center of the dial and at the centre of a crystal of non-uniform thickness. The device can be made simply, aesthetically and economically with a small number of parts and has a high level of lighting efficiency.

The invention therefore concerns a lighting device with central symmetry for a dial comprising at least one information display. In the case of a timepiece, this display can be of the analogue type by means of hands driven and carried by a pipe passing through the dial and/or of the digital type. The dial is arranged in a case closed on its top part by a crystal and on its bottom part by a back cover delimiting, with the dial, a housing for receiving the display control means and an energy source powering the display control means and a light source located in the housing under the dial. The device is characterized in that the thickness of the crystal decreases regularly from the centre to the periphery thereof and in that a cylindrical light guide passes through the centre of the dial, one end of the guide receiving the light flux from the light source and the opposite end facing a reflector with axial symmetry formed in a hollow in the centre of the crystal for reorienting the rays from the light source by total internal reflection in the thickness of the crystal and for allowing them to emerge towards the dial when the maximum angle of incidence on the inner face of the crystal is greater than the maximum angle of refraction. The external face of the crystal can then have the shape of a cone with a small base angle Y, or a spherical sector and more generally a curved sector, and the inner face has the form of a plane or a spherical sector. Thus, in a non-limiting manner, the crystal can be of the plano-conical, plano-convex, convex-conical or divergent meniscus type.

The shape of the reflector has axial symmetry with rectilinear walls, for example conical, or convex walls. It may also have the shape of a regular pyramid, for example with a dodecagonal base for lighting the twelve hour symbols of a timepiece.

According to a first embodiment, the reflector is formed in a hollow in the external face of the crystal and may comprise a reflective coating.

According to a second embodiment, the reflector is formed in a hollow in the inner face of the crystal and comprises a reflective coating for reorienting the rays radially in the thickness of the crystal.

If the lighting device is incorporated in a timepiece, the light guide can form the hour wheel pipe or be incorporated therein without however interfering in any way with the proper working of the timepiece.

BRIEF DESCRIPTION OF THE DRAWINGS

Other features and advantages of the present invention will appear in the following description of various embodiments, given by way of non-limiting illustrative example, with reference to the annexed drawings, in which.

DETAILED DESCRIPTION OF THE DRAWING

Figure 1:
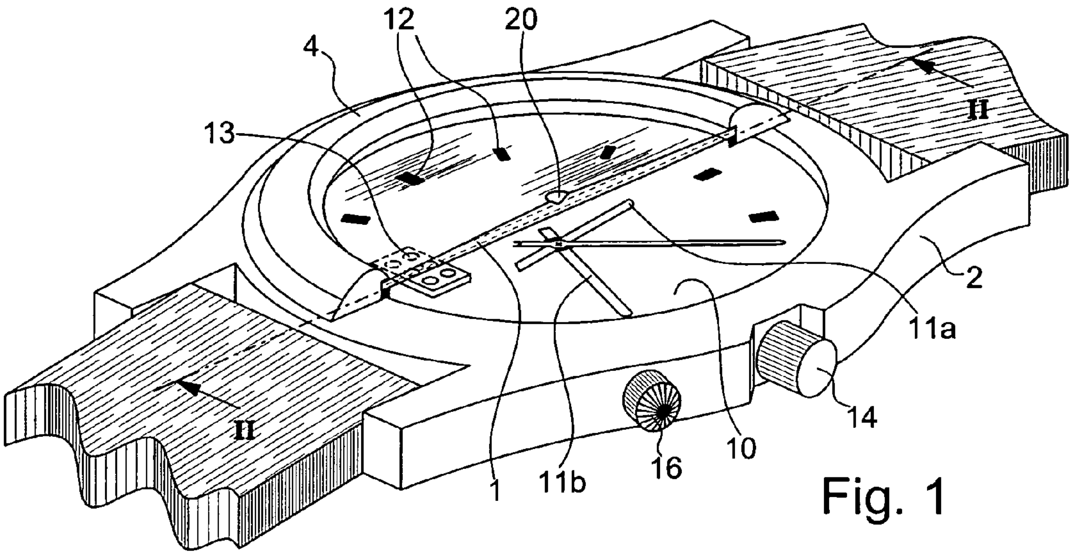
FIG. 1 is a partially cutaway perspective diagram of a first embodiment of a lighting device according to the invention.
Figure 2:
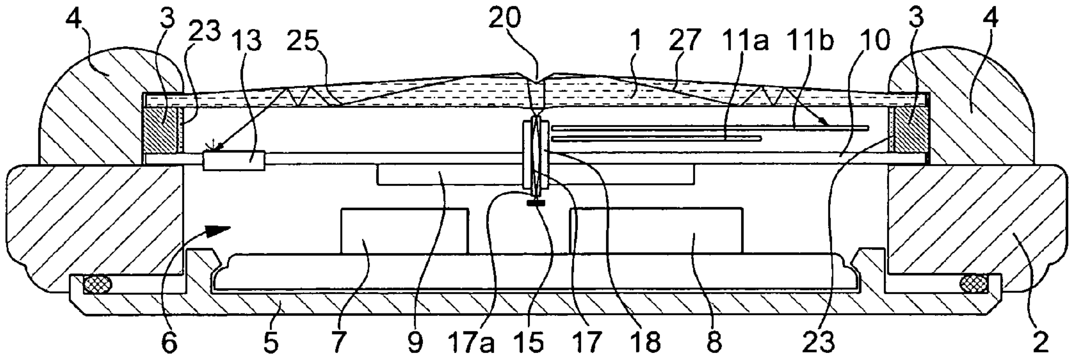
FIG. 2 is a diagonal cross-section along the arrows II—II of FIG. 1.
Figure 3:
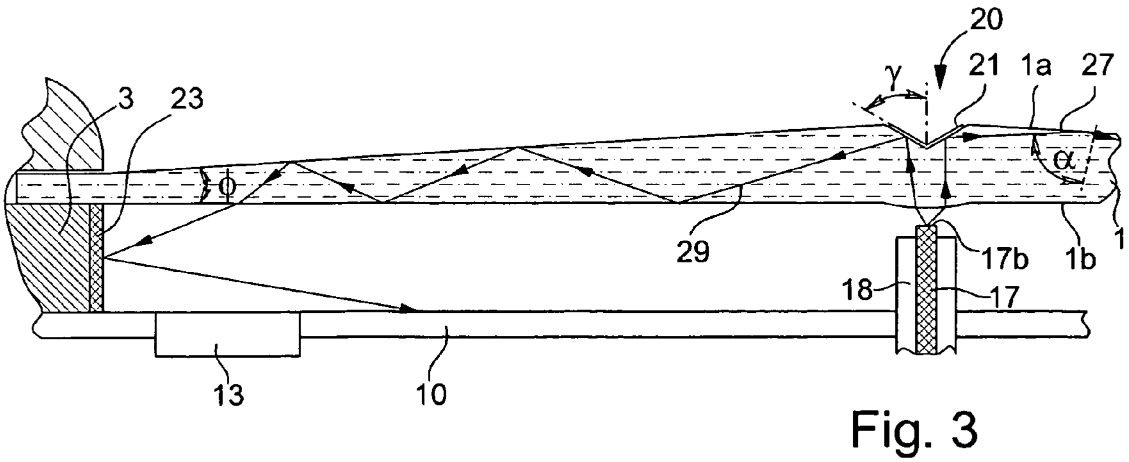
FIG. 3 is a partial enlarged view of the device of FIG. 2.

With reference first of all to FIGS. 1 to 3, a first lighting embodiment of the invention is shown, taking as example the lighting of a wristwatch dial 10. Dial 10 is arranged in a circular case comprising a middle part 2 closed on its top part by a crystal 1 held between a flange 3 and a bezel 4, and on its bottom part by a back cover 5 delimiting a housing 6. Housing 6 is for receiving an energy source 7 used for powering the display control means 8. In this example, control means 8 are formed by a time-keeping circuit provided for controlling, on the one hand, a stepping motor 9 driving the hands 11*a*, 11*b* opposite symbols 12 carried by dial 10 to give information in analogue form, on the other hand a digital display 13, formed, for example, by a reflective liquid crystal cell (LCD). Housing 6 also contains a light source 15 powered by energy source 7 and able to be controlled by a push-button 16 arranged on middle part 2 and separate from crown 14. Other control means can evidently be envisaged, for example touch type control means on the crystal.

Light source 15, which is, for example, a diode (LED) is arranged facing the end 17*a* of a light guide 17 that passes through the dial. Light source 15 could evidently occupy another position in the housing, the light flux then being guided for example by a fibre optic to end 17*a* of light guide 17. In the case of a wristwatch comprising at least one analogue display, guide 17 is housed in the hour wheel pipe 18, and the end 17 thereof opens out opposite crystal 1 whose particular conformation will be described hereinafter. Guide 17 can be made of polymethylmethacrylate (PMMA) or any other known material able to form a light guide, and via multiple internal reflections, produces at its outlet or exit face, a lambertian type beam whose axis corresponds to the centre of crystal 1.

As can be seen, crystal 1 comprises a flat inner face 1*b* parallel to dial 10, and a slightly conical external face 1*a*, i.e. forming an angle $\phi$ at the base with inner face 1*b*. Angle $\phi$ is for example comprised between 10° and 5° and corresponds in the Figures to an angle of approximately 6°. The choice of this angle of conicity $\phi$ evidently depends upon the refractive index of the material forming the crystal and other construction parameters.

The central part of the crystal comprises a reflector 20 of conical shape, for reorienting the incident rays inside crystal 1. Reflector 20 is shaped in a hollow in external face 1*a* with an aperture of angle $\gamma$ in relation to the axis of symmetry of crystal 1. The value to be given to angle $\gamma$ evidently depends upon numerous construction parameters of the crystal (diameter, value of $\phi$, refractive index of the crystal), the value of $\gamma$ being approximately 60° in the example shown.

As a function of these construction parameters, angle $\gamma$ has to allow total reflection on the external face of the crystal. In order to totally guarantee this reflection, it is possible to coat the external surface of reflector 20 with a reflective coating 21, made for example by silver evaporation.

For all of the rays reflected by reflector 20, crystal 1 behaves radially like a wave guide of type $\alpha$-2$\phi$, guiding the light by total internal reflection (TIR) until the angle of incidence inside the inner face 1*a* of crystal 1 becomes less than the maximum refractive angle, for example 42.2° if the crystal is made of PMMA, and emerges by refraction in the direction of dial 10.

This path is illustrated by the ray referenced 25 which strikes the LCD digital display and by the ray referenced 27 which strikes the hands. If the ray, referenced 29 in FIG. 3, emerges too close to the edge of crystal 1, it will not strike dial 10, but flange 3, which will then preferably be coated with a reflective film for reorienting the ray towards dial 10. The device that has just been described thus allows uniform lighting of the dial to be obtained with a high level of efficiency, more than 20% of the light emitted by the light source. As a function of the construction parameters, this lighting can be uniform over the entire dial, or only on the ring with central symmetry, on which the symbols are inscribed, for example the time symbols 12 of a timepiece.

According to a variant that is not shown, conical reflector 20 can be replaced by a pyramidal reflector, for example with a dodecagonal base for preferentially lighting hour symbols 12.

Figure 4:
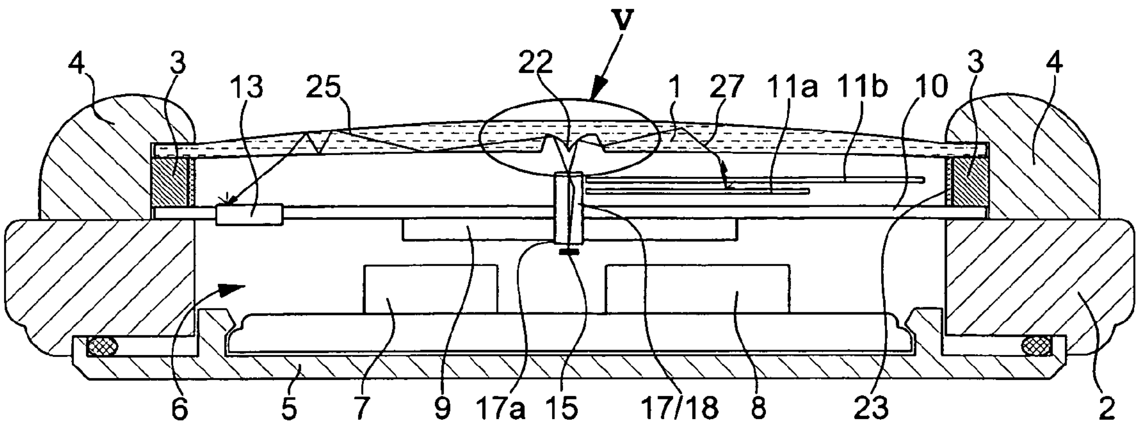
FIG. 4 corresponds to FIG. 2 according to a second embodiment.
Figure 5:
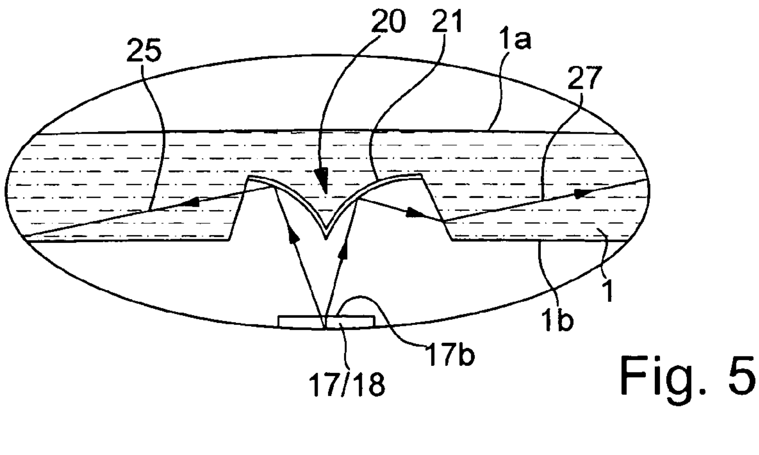
FIG. 5 is an enlarged view of the device along the arrow V of FIG. 4.

Referring now to FIGS. 4 and 5, there is shown a second embodiment that differs from that previously described essentially in that the shape of the crystal is of the convergent meniscus type, and in that the reflector 22 is formed in the inner face 1*b* of crystal 1, while having an external surface coated with a reflective coating 21 for reorienting the rays inside the crystal in accordance with the same principle as that described in the first embodiment. As can be seen more clearly in an enlarged view in FIG. 5, reflector 22 has a curved wall shape.

As will be clear, the embodiments that have just been described illustrate in an "interchangeable" manner various embodiments and can, without departing from the scope of the present invention, give rise to numerous variants depending upon the dimensions and materials used, both as regards the case and the crystal, and the final appearance that one wishes to obtain.

The invention claimed is:

1. Lighting device with central symmetry for a dial including at least one information display, said dial being arranged in a case closed at its top part by a crystal delimited by an external face and by an internal face and on its bottom part by a back cover delimiting with the dial a housing for receiving an energy source powering the display control, means and a light source located in the housing, wherein the thickness of the crystal decreases regularly from the centre to the periphery thereof and in that a cylindrical light guide passes through the centre of the dial, one end of said guide being opposite the light source and the opposite end being opposite a reflector with axial symmetry formed in a hollow in the centre of the crystal for reorienting the rays from the light source by total internal reflection in the thickness of the crystal, and allowing them to emerge towards the dial when the angle of incidence on the inner face of the crystal is greater than the maximum angle of refraction.

2. Lighting device according to claim 1, wherein the external face of the crystal has the shape of a cone or a spherical sector, and the inner face thereof has the shape of a plane or spherical sector.

3. Lighting device according to claim 1, wherein the reflector has a rectilinear or curved wall shape while the tip thereof is oriented towards the dial.

4. Lighting device according to claim 1, wherein the reflector has a pyramidal shape while the tip thereof is oriented towards the dial.

5. Lighting device according to claim 3, wherein the reflector has a conical revolution shape made in a hollow in the top face of the crystal.

6. Lighting device according to claim 1, wherein the reflector is made in a hollow in the inner face of the crystal and comprises a reflective coating.

7. Lighting device according to claim 1, wherein the guide is made of polymethylmethacrylate.

8. Lighting device according to claim 1, wherein the light source is a diode.

9. Lighting device according to claim 1, wherein the case is that of a watch case whose dial, surrounded by a flange, and includes an analogue display by means of hands driven and carried by an hour wheel pipe passing through the dial and/or a digital display.

10. Lighting device according to claim 9, wherein the digital display is a reflective liquid crystal display.

11. Lighting device according to claim 9, wherein the flange includes a reflective coating.

12. Lighting device according to claim 9, wherein the light guide forms the hour wheel pipe for the hands.

13. Lighting device according to claim 9, wherein the light guide is housed in the hour wheel pipe for the hands.

14. Lighting device according to claim 9, wherein the light source is switched on by means of an external control member.

* * * * *